(12) United States Patent
Wang et al.

(10) Patent No.: US 12,532,185 B2
(45) Date of Patent: Jan. 20, 2026

(54) REDUCING INTERFERENCE BETWEEN CHANNELS OF WIRELESS WIDE AREA NETWORK AND WIRELESS LOCAL AREA NETWORK

(71) Applicant: Hewlett Packard Enterprise Development LP, Spring, TX (US)

(72) Inventors: Bo Wang, Beijing (CN); Kehui Cai, Beijing (CN); Hongli Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 414 days.

(21) Appl. No.: 18/145,154

(22) Filed: Dec. 22, 2022

(65) Prior Publication Data

US 2024/0214827 A1    Jun. 27, 2024

(51) Int. Cl.
*H04W 16/14* (2009.01)
*H04W 48/16* (2009.01)

(52) U.S. Cl.
CPC ........... *H04W 16/14* (2013.01); *H04W 48/16* (2013.01)

(58) Field of Classification Search
CPC .............................. H04W 48/16; H04W 16/14
See application file for complete search history.

(56) References Cited

U.S. PATENT DOCUMENTS

| | | | |
|---|---|---|---|
| 6,006,112 A * | 12/1999 | Rucki | ..................... H04B 17/20 455/560 |
| 9,119,124 B2 | 8/2015 | Shi | |
| 10,651,823 B2 | 5/2020 | Kenichi | |
| 10,886,614 B2 | 1/2021 | Lee et al. | |
| 10,892,552 B2 | 1/2021 | Hsu et al. | |
| 2011/0116490 A1 * | 5/2011 | Wilhelmsson | ........ H04W 16/14 370/343 |

(Continued)

FOREIGN PATENT DOCUMENTS

EP    3771093 A1    1/2021

OTHER PUBLICATIONS

Claus Hetting , "Wi-Fi percentage of US smartphone traffic at 74%, says Netradar", available online at <https://web.archive.org/web/20191129014740/https://wifinowevents.com/news-and-blog/wi-fi-percentage-of-us-smartphone-traffic-at-74-says-netradar/>, Nov. 30, 2018, 5 pages.

*Primary Examiner* — Dai Phuong
(74) *Attorney, Agent, or Firm* — Hewlett Packard Enterprise Patent Department

(57) ABSTRACT

In implementations of the present disclosure, there is provided an approach for reducing interference between channels of a wireless wide area network (WWAN) and channels of a wireless local area network (WLAN). A method comprises determining a first working channel in a first frequency band of a WWAN, and selecting a first filter from a first set of filters corresponding to the first frequency band based on the first working channel. Then, a second filter from a second set of filters corresponding to a second frequency band in a WLAN and a second working channel in the second frequency band are selected. The determined first working channel and the selected second working channel are used to transmit data. Implementations of the present disclosure can help the terminal device to use channels of WWAN and WLAN simultaneously and reduce interference between channels of WWAN and WLAN.

16 Claims, 8 Drawing Sheets

(56) References Cited

U.S. PATENT DOCUMENTS

| | | | |
|---|---|---|---|
| 2013/0215863 A1* | 8/2013 | Sun | H04W 16/14 370/329 |
| 2015/0195844 A1 | 7/2015 | Yang | |
| 2018/0063880 A1 | 3/2018 | Bhardwaj | |
| 2020/0328766 A1 | 10/2020 | Yamaguchi | |
| 2020/0382102 A1 | 12/2020 | Naniwa et al. | |
| 2021/0314010 A1 | 10/2021 | Tsuda et al. | |

* cited by examiner

500A

| FREQUENCY RANGES OF CHANNLES ON THE WWAN SIDE | FILTERS ON THE WLAN SIDE |
|---|---|
| 2300-2320MHZ | FILTER 3 |
| 2301-2321MHZ | FILTER 3 |
| ... | ... |
| 2350-2370MHZ | FILTER 3 |
| 2351-2371MHZ | FILTER 4 |
| ... | ... |
| 2380-2400MHZ | FILTER 4 |

| IDENTIFIERS OF FILTERS ON THE WWAN SIDE | IDENTIFIERS OF FILTERS ON THE WLAN SIDE |
|---|---|
| FILTER 1 | FILTER 3 |
| FILTER 2 | FILTER 4 |

| FREQUENCY RANGES OF FILTERS ON THE WWAN SIDE | FREQUENCY RANGES OF FILTERS ON THE WLAN SIDE |
|---|---|
| 2300-2370 MHZ | 2402-2432 MHZ |
| 2350-2400 MHZ | 2432-2483 MHZ |

*FIG. 5C*

REDUCING INTERFERENCE BETWEEN CHANNELS OF WIRELESS WIDE AREA NETWORK AND WIRELESS LOCAL AREA NETWORK

BACKGROUND

The ever-increasing demand for higher data rates and reduced buffering time has driven the continuous evolution of cellular communication and transmission. However, due to the high cost of wired equipment, the last mile of communication becomes a pain point. In order to satisfy the demand of the users, terminal devices with both a wireless wide area network (WWAN) module and a wireless local area network (WLAN) module are provided to serve the users, such as Customer Premise Equipment (CPE).

The terminal device uses the cellular technology in the WWAN and Wi-Fi technology in the WLAN to achieve communication between the user device and the base station. The two technologies are complementary technologies, and the effective coexistence of the two technologies can offer substantially increased data rates with negligible latency and can enhance the user experience.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

FIGS. 5A-5C illustrate some examples of the mapping tables for selecting a filter according to implementations of the present disclosure;

DETAILED DESCRIPTION

Figure 1:
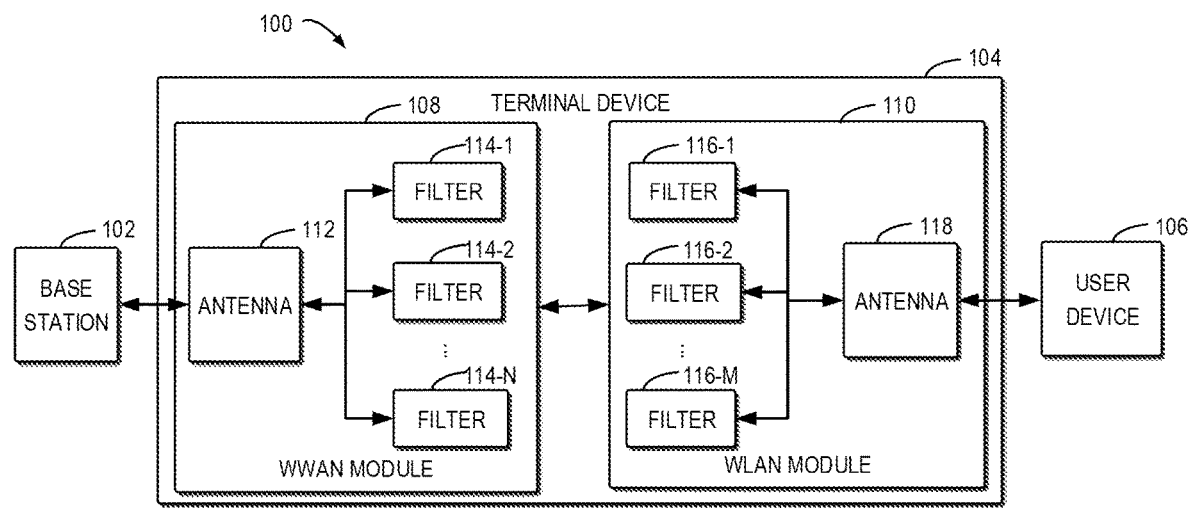
FIG. 1 illustrates a block diagram of an example environment in which example implementations of the present disclosure may be implemented.

As discussed above, to increase data rates with negligible latency and enhance the user experience, the WWAN module and the WLAN module are set in the terminal device at the same time. However, potential coexistence issues of the WWAN module and the WLAN module cannot be ignored. For example, the frequency range of Long-Term Evolution (LTE) Band 40 is 2.3-2.4 GHz, while the frequency range of the 2.4 G Wi-Fi Band is 2.402-2.482 GHz. Due to the proximity of some working channels of WWAN and WLAN in the 2.4 GHz spectrum, the utilization of both WWAN and WLAN spectrums may cause interference. When the distance between a frequency range of a working channel in the LTE Band 40 and a frequency range of a working channel in the 2.4G Wi-Fi Band is lower than a distance threshold, such as 30 Mhz, the two working channels will not work correctly due to a blocking noise and an in-band noise between the two working channels.

One traditional solution for avoiding interference is that the WWAN module gives up some available bandwidth. If the interval of the WWAN spectrum and the WLAN spectrum is above an interval threshold, the interference of WWAN and WLAN spectrums can be reduced to an accept level. Another traditional solution for avoiding interference is to add a traffic management unit between the WWAN module and the WLAN module. When the WWAN and WLAN modules work on adjacent channels which are close enough to cause an interference issue between these two modules, the WWAN and WLAN modules can only work in an air time sharing way by using of the traffic management unit rather than at the same time.

Although the above traditional solutions can avoid the signal interference, there are still some defects with the traditional solutions. The first traditional solution gives up some available bandwidth, which wastes valuable communication resources. Another traditional solution adds a traffic management unit between the WWAN module and WLAN module, which requires complex software configuration and additional hardware, and the WWAN and WLAN modules can only work in a time-sharing way. This also causes the spectrum resources to be wasted and increases the complexity and cost of the terminal device.

Therefore, implementations of the present disclosure propose a solution of avoiding the interference of WWAN and WLAN spectrums, and the proposed solution may be implemented through at least two sets of filters. According to implementations of the present disclosure, after a first working channel and a first filter on the WWAN side are determined, a second working channel and a second filter on the WLAN side can be selected based on the determined first channel or the determined first filter. The distance between a first frequency range of the first filter and a second frequency range of the second filter is greater than a threshold distance. When the determined first working channel and the selected second working channel are used simultaneously, the interference between the two working channels can be acceptable because the interval between the two channels is large enough.

Implementations of the present disclosure may use any available working channels in the WWAN spectrum, and then select a working channel in the WLAN spectrum based on the used working channel in the WWAN spectrum. Therefore, it does not need to give up any spectrum resource on the WWAN side. Moreover, implementations of the present disclosure can avoid interference without adding any traffic management unit, so it is cost-effective and does not require complex software configuration.

Other advantages of implementations of the present disclosure will be described with reference to the example implementation as described below. Reference is made below to FIG. 1 through FIG. 7 to illustrate basic principles and several example implementations of the present disclosure herein.

FIG. 1 illustrates a block diagram of an example environment 100 in which example implementations of the present disclosure may be implemented. As shown in FIG. 1, there are a base station 102, a user device 106, and a terminal device 104 that can facilitate the communications between the base station 102 and the user device 106.

As shown in FIG. 1, the terminal device 104 includes a WWAN module 108 and a WLAN module 110. The terminal device 104 also includes other components, for example, a memory, physical network interfaces, and so forth. In some implementations, the terminal device 104 may be Customer Premise Equipment (CPE). The WWAN module 108 is used to communicate with the base station 102, and the WLAN module 110 is used to communicate with the user device 106.

The WWAN module 108 includes an antenna 112, and the WWAN module 108 can communicate with the base station 102 via the antenna 112. The WWAN module 108 also includes a set of filters (also referred as a first set of filters), and the set of filters includes a filter 114-1, a filter 114-2, . . . , and filter 114-N, wherein N is an integer. In some implementations, one frequency band is used by the WWAN module 108, and the frequency band may be referred to as the first frequency band. In one example, the first frequency band may be LTE band 40, which has a frequency range of 2300 MHz-2400 MHz. In another example, the first frequency band may be LTE band 41, which has a frequency range of 2496 MHz-2690 MHz. In yet another example, the first frequency band may be LTE band 7, which has a frequency range of 2500 MHz-2570 MHz. The frequency range of the first frequency band is distributed among the first sets of filters. The frequency range of each of the first set of filters is included in the first frequency band, and the overlap frequency range of two filters of the first set of filters is less than the maximum bandwidth of the channels used by the WWAN module 108. For example, the maximum bandwidth of the channels used by the WWAN module 108 may be 20 MHz.

The WWAN module 108 may scan channels in the first frequency band to obtain configuration information from a base station 102. In some implementations, the WWAN module 108 scans channels in the first frequency band by using each of the first set of filters to obtain the configuration information from the base station. The configuration information may include information of the first working channel used by the WWAN module 108 and the base station 102. After the configuration information is obtained, a filter is determined to communicate with the base station 102 via the determined filter. For example, the filter may be determined by determining whether a frequency range of a filter of the set of filters includes the first working channel. After the first working channel and the first filter are determined, the first channel or the first filter is used to determine a second working channel and a corresponding filter used by the WLAN module 110.

The WLAN module 110 includes a second set of filters, and the second set of filters includes filter 116-1, filter 116-2, . . . , and filter 116-M, wherein M is an integer. The integer M may be equal to the integer N or is not equal to the integer N. The combined frequency ranges of the second set of filters may be the same as the second frequency band used between the WLAN module 110 and the user device 106, and the frequency ranges of two filters of the second set of filters may be overlapped or not overlapped. After the first channel or the first filter is determined, a second filter is selected from the second set of filters. The selection of the second filter may be based on a mapping table, which will be described below with reference to FIGS. 5A-5C. The distance between the selected second filter and the selected first filter is greater than the threshold distance. For example, the threshold distance may be 30 MHz, i.e. the frequency range of the second filter differs from the frequency range of the first filter by more than 30 MHz. After the second filter is selected from the second set of filters, the frequency range of the second filter is determined accordingly. As predetermined, there are a set of working channels included in the frequency range of the second filter. If the set of working channels interfere with each other, a working channel (also referred to as a second working channel) may be selected from the set of channels based on the channel qualities of the set of working channels. Alternatively, if the set of working channels includes at least two channels which do not interfere with each other, the second working channel may be selected from the at least two channels based on the channel qualities of the two channels. Then, the selected second working channel is used to transmit data between the WLAN module 110 and the user device 106 via an antenna 118.

As shown in FIG. 1, there is one frequency band and one corresponding set of filters in the WWAN module 108. In some implementations, the WWAN module 108 may use a plurality of frequency bands. For example, the plurality of frequency bands may include LTE Band 40 and LTE Band 41. In this case, the WWAN module 108 may include several sets of filters, and each set of filters corresponds to a frequency band. The frequency range of each set of filters is included in the respective frequency band, and the overlap frequency range of two filters of each set of filters is less than the maximum bandwidth of the channels used by the WWAN module 108. When the WWAN module 108 starts to establish communication with the base station 102, it is required to scan channels on the frequency bands. If the configuration information is found in one frequency band, the first working channel may be obtained from the configuration information, and the one frequency band can be called as the first frequency band. A set of filters corresponding to the one frequency band may be called as the first set of filters, and then the first working channel in the configuration information and the corresponding filter will be used.

Figure 2A:
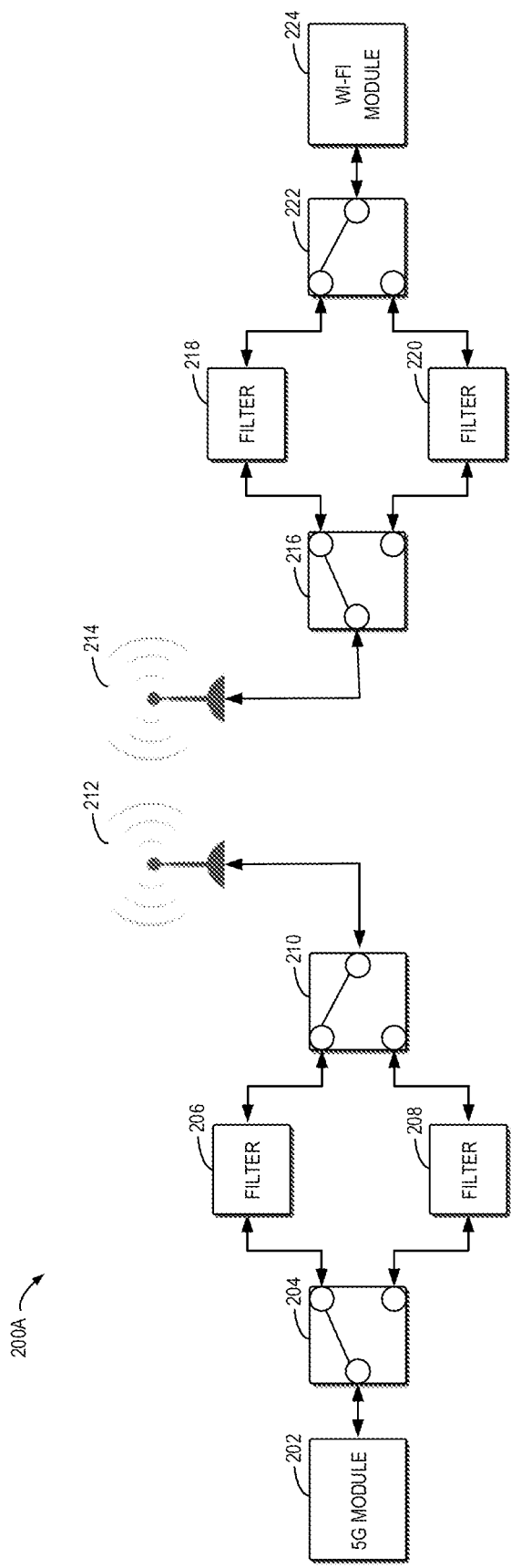
FIG. 2A illustrates an example of an architecture of the terminal device according to implementations of the present disclosure.

FIG. 2A illustrates an example of an architecture 200A of the terminal device according to implementations of the present disclosure. As shown in FIG. 2A, the WWAN module includes a 5G module 202, a switch 204, a first set of filters 206 and 208, a switch 210, and an antenna 212. The switch 204 is connected between the 5G module 202 and two filters 206 and 208, and the two filters 206 and 208 are connected to the antenna 212 via the switch 210. For example, the switch 204 and the switch 210 may be the Single Pole Double Throw (SPDT) switches. Each filter of the two filters 206 and 208 has a predetermined frequency range in the first frequency band. In one example, an LTE band 40 is used by the 5G module 202 and a frequency range of the LTE band 40 is 2300 MHz (2.3 GHz)-2400 MHz (2.4 GHz). Further, the WLAN module includes a Wi-Fi module 224, which is used to communicate with the user device. The Wi-Fi module 224 uses the 2.4G Wi-Fi Band, and the frequency range of the 2.4 G Wi-Fi Band is 2402-2483 MHz. Therefore, there will be interference near 2400 MHz between the channels used by the 5G module 202 and the Wi-Fi module 224. In order to avoid the interference between the channels, the frequency range of one filter of the filters 206 and 208 needs to distance from 2400 MHz above a threshold distance, for example 30 MHz. For example, the frequency range of filter 206 is set as 2300-2370 MHz, and the frequency range of filter 208 is set as 2350-2400 MHz. The frequency range of filter 206 overlaps with the frequency range of filter 208 by 20 MHz, which is the maximum bandwidth of the channels in the LTE band 40.

In another example, an LTE band 41 is used by the 5G module 202 and the frequency range of the LTE band 41 is 2496 MHz -2690 MHz, while the Wi-Fi module 224 uses the 2.4G Wi-Fi Band. In order to avoid interference between the channels near 2400 MHz, the frequency range of one filter of the filters 206 and 208 needs to distance from 2400 MHz above a threshold distance, for example, 30 MHz. For example, the frequency range of filter 206 is set as 2496-2570 MHz, and the frequency range of filter 208 is set as 2550-2690 MHz.

As shown in FIG. 2A, when the 5G module 202 establishes a connection with the base station via the antenna 212, the switch 204 and switch 210 are switched to select the filter 206. Then the 5G module 202 scans channels in the frequency range of filter 206. After the frequency range of filter 206 is scanned, the switch 204 and switch 210 are switched to select the filter 208. Then the 5G module 202 scans channels in the frequency range of filter 208. After all channels corresponding to filters 206 and 208 are scanned, the configuration information from the base station can be obtained. The configuration information may include information of the working channel used by the base station, and the working channel may be determined from the configuration information.

As shown in FIG. 2A, the WLAN module includes an antenna 214, a switch 216, a second set of filters 218 and 220, a switch 222, and a Wi-Fi module 224. The filters 218 and 220 are connected to the antenna 214 via the switch 216. In order to avoid the interference between the channels, the frequency range of one filter of the filters 218 and 220 needs to distance from 2400 MHz above a threshold distance, and the other filter has the remaining frequency range of the second frequency band used by the Wi-Fi module 224. In one example, the frequency range of the filter 218 may be 2402-2432 MHz, and the frequency range of the filter 220 may be 2432-2483 MHz. For example, the 2.4G Wi-Fi Band includes thirteen channels. Therefore, the channels 1-5 correspond to filter 218, and channels 6-13 correspond to the filter 220. In another example, the frequency of the filter 218 is 2402-2447 MHz and the frequency of the filter 220 is 2447-2483 MHz. Therefore, the channels 1-8 correspond to the filter 218, and the channels 9-13 corresponds to the filter 220. Therefore, when the first working channel and the first filter on the WWAN side are selected, then a second filter is selected from the second set of filters on the WLAN side. The second working channel is selected from a plurality channels corresponding to the second filter, such as the channels 1-5 or the channels 6-13.

Although the 2.4G Wi-Fi Band has 13 channels, the channels that are completely free of interference are channels 1, 6, and 11. In some implementations, when the filter 218 or the filter 220 is selected to be used, a set of working channels corresponding to the selected filter is determined. If the set of working channels interferes with each other, the working channel is selected from the set of working channels based on the channel qualities. Alternatively, if the set of working channels includes one of channels 1, 6, and 11, the one channel 1, 6, or 11 is used as the working channel. If the set of working channels includes at least two channels which do not interfere with each other, the working channel is selected from the at least two channels based on the channel qualities of the two channels. For example, if the set of working channels includes channels 6 and 11, the working channel will be selected from channels 6 and 11. The channel qualities for 13 channels may be obtained by the Wi-Fi module 224. For example, the Wi-Fi module 224 may monitor the channel qualities of the 13 channels.

Figure 2B:
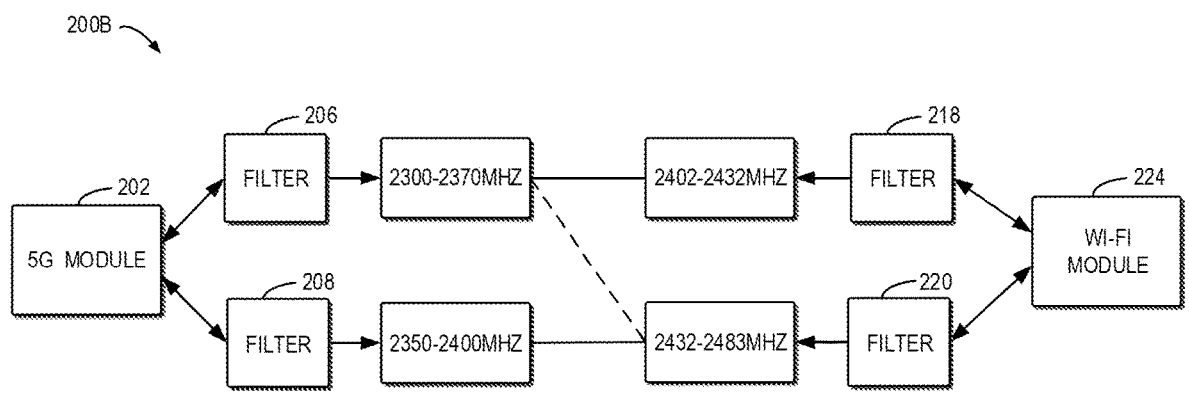
FIG. 2B illustrates an example for selecting filters according to implementations of the present disclosure.

FIG. 2B illustrates an example 200B of the selecting filter according to implementations of the present disclosure. As shown in FIG. 2B, the frequency range of the filter 206 is 2300-2370 MHz, and the frequency range of the filter 208 is 2350-2400 MHz. When the filter 206 is used on the WLAN side, the filters 218 on the WLAN side may be used because the distance between the frequency ranges of filters 206 and 218 is greater than a threshold distance, for example, 30 Mhz. The frequency range of filter 218 is 2402-2432 MHz, which includes channels 1-5. In some implementations, when the filter 218 is selected, one working channel can be selected from channels 1-5 based on the channel qualities of channels 1-5. The channel qualities of channels 1-13 can be obtained by the terminal device. In some implementations, when the filter 218 is selected, the channel 1 is selected because channels 1, 6, and 11 are completely free of interference. Alternatively, when the filter 206 is selected, the filter 218 and filter 220 may be used, which has a frequency range of 2432-2482 MHz. Then, the second working channel may be selected from all channels 1-13. In this case, the second working channel may be selected from channels 1, 6, and 11 based on the channel qualities of channels 1, 6, and 11.

As shown in FIG. 2B, if the filter 208 which has a frequency range of 2350-2400 MHz is selected, the filter 220 which has a frequency range of 2432-2483 MHz is selected to avoid signal interference between channels used by the 5G module 202 and the Wi-Fi module 224. Then, the second working channel is selected from the channels 6-13 corresponding to the filter 220. This can ensure that the distance between the first working channel used by 5G module and the second working channel used by the Wi-Fi module is greater threshold distance to avoid the interference between the two working channels. The frequency ranges of the filters shown in FIG. 2B is an example, and other frequency ranges of the filters are also possible.

Figure 3:
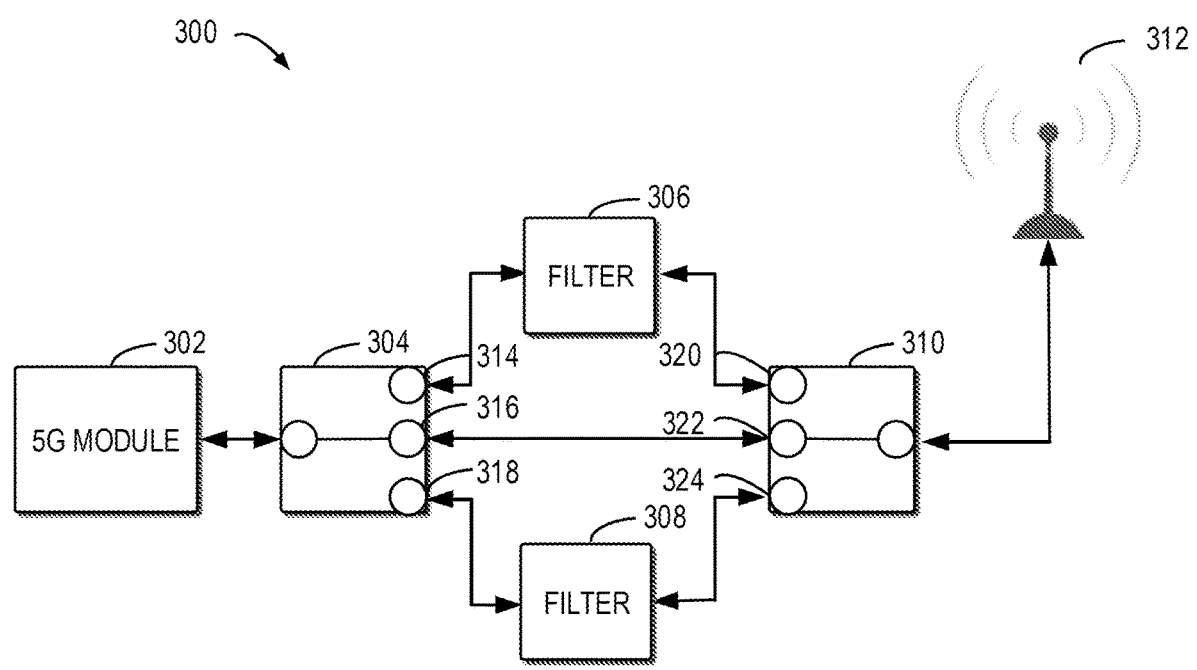
FIG. 3 illustrates an example of the WWAN module according to implementations of the present disclosure.

FIG. 3 illustrates an example 300 of the WWAN module according to implementations of the present disclosure. As shown in FIG. 3, the 5G module 302 is connected to a switch 304, which includes three connecting points 314, 316, and 318. For example, the switch 304 may be single pole triple throw switch. The filter 306 and filter 308 are connected between the switches 304 and 310. The switch 310 also includes three connecting points 320, 322, and 324, and the switch 310 is connected to an antenna 312. The 5G module 302, the filters 306, 308, and the antenna 312 may be the same as the corresponding components in FIG. 2A.

In order to reduce the complexity of establishing the connection with the base station, the switches could be connected directly. For example, in FIG. 3, when the 5G module 302 firstly establishes a connection with the base station, the switch 304 is switched to the connecting point 316, and the switch 310 is switched to connecting point 322. Then, the 5G module 302 scans all channels in the first frequency band to obtain configuration information from the base station. The configuration information includes the first working channel, which is determined by the base station, and the first working channel can be obtained from the configuration information. Then, the first filter is determined based on the first working channel. The switches 304 and 310 are switched to the respective connecting points (such as points 314 and 320) for the filters 306 or 308. The direct connection between the switch 304 and switch 310 can reduce the switching operation of the switches.

Figure 4:
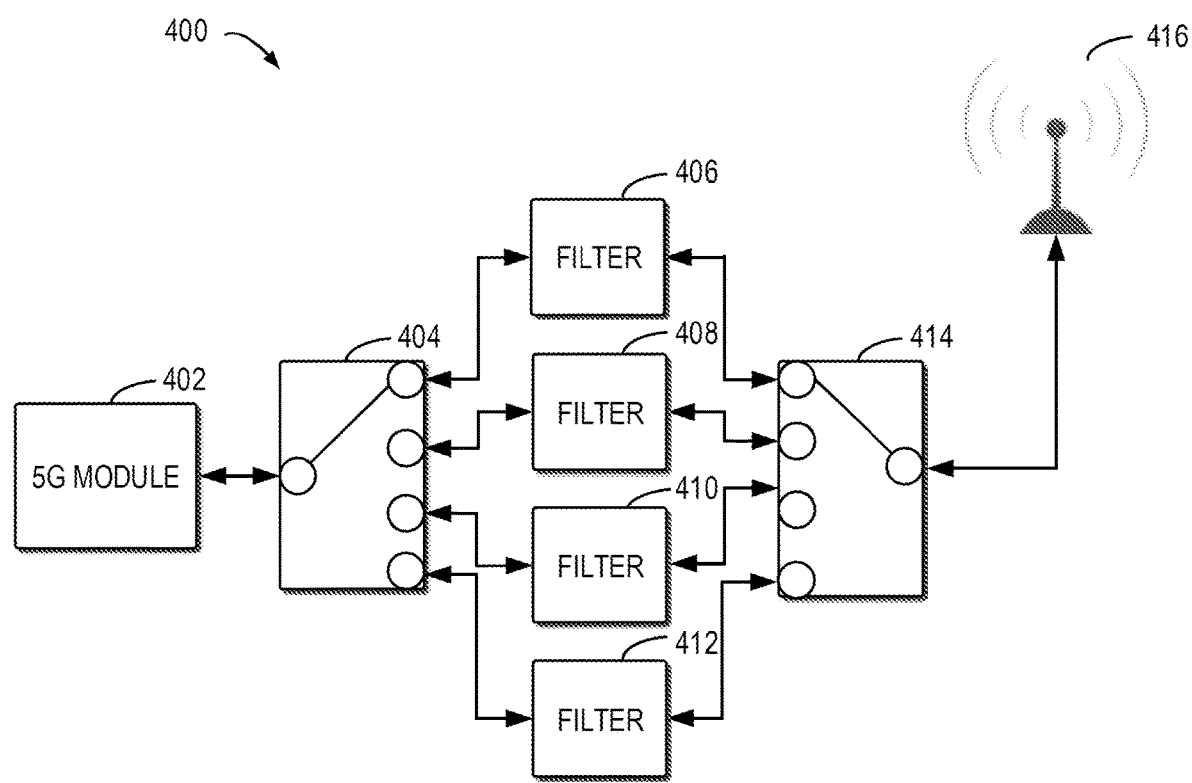
FIG. 4 illustrates another example of the WWAN module according to implementations of the present disclosure.

FIG. 4 illustrates another example 400 of the WWAN module according to implementations of the present disclosure. As shown in FIG. 4, the 5G module 402 communicates with a base station via an antenna 416. There are two sets of filters between the 5G Module 402 and the antenna 416. One set of filters includes filter 406 and filter 408, which correspond to one frequency band, such as LTE Band 40. The other set of filters includes filter 410 and filter 412, which correspond to another frequency band, such as LET Band 41 or LTE Band 7. When the terminal device establishes a connection with the base station, the 5G module 402 scans channels in the one frequency band to obtain configuration information by using the filter 406 and filter 408. If the terminal device can find the configuration information from the one frequency band, one filter of filter 406 and filter 408 will be used to communicate with the base station by switching a switch 404 and a switch 414 to the corresponding connection point. If the terminal device cannot find the working channel in the one frequency band, the terminal device will find the working channel in the other frequency band by using the filter 410 and filter 412. When the working channel is found in the other frequency band, the respective filter of filter 410 and filter 412 is selected by switching the switch 404 and the switch 414 to the corresponding connection point. As used herein, the frequency band from which the configuration information is obtained may be referred as the first frequency band.

FIGS. 5A-5C illustrate some examples of the mapping tables according to implementations of the present disclosure. The mapping tables may be used to determine the second filter used by the WLAN module based on the first working channel or the first filter used by the WWAN module.

In some implementations, the mapping table may include a mapping between the frequency ranges of channels on the WWAN side and the second set of filters on the WLAN side. Therefore, the frequency range of the first working channel may be transmitted to the WLAN module to determine a filter used by the WLAN module based on the mapping table. As shown in a mapping table 500A in FIG. 5A, there are filter 3 and filter 4 on the WLAN side, and the frequency range of filter 3 is 2402-2432 MHz, and the frequency range of filter 4 is 2432-2483 MHz. The mapping table 500A shows the corresponding relationships between the frequency ranges of channels on the WWAN side and the filters on the WLAN side. Therefore, after the first working channel is determined, the frequency range of the first working channel may be transmitted to the WLAN module to determine the second filter based on the mapping table 500A, as shown in FIG. 5A. In this way, the second filter can be determined based on the frequency ranges of the determined working channel on the WWAN side.

In some implementations, the mapping table may include a mapping between the identifier of the first set of filters on the WWAN side and the identifiers of the second filters on the WLAN side. Therefore, the identifier of the first filter can be transmitted to the WLAN module to determine the filter used by the WLAN module based on the mapping table. As shown the mapping table 500B in FIG. 5B, there are filter 1 and filter 2 on the WWAN side and filter 3 and filter 4 on the WLAN side. The mapping table 500B shows the corresponding relationships between the filters 1 and 2 on the WWAN side and the filters 3 and 4 on the WLAN side. Therefore, after the first filter for the WWAN module is determined, the identifier of the first filter may be transmitted to the WLAN module so as to determine the second filter based on the mapping table 500B shown in FIG. 5B. In this way, the second filter on the WLAN side can be determined based on the identifier of the determined filter on the WWAN side.

In some implementations, the mapping table may include a mapping between the frequency ranges of the first set of filters on the WWAN side and the frequency ranges of the second set of filters on the WLAN side. Therefore, the frequency range of the first filter may be transmitted to the WLAN module to determine the filter used by the WLAN module based on the mapping table. As shown in a mapping table 500C in FIG. 5C, there are frequency ranges corresponding to filters on the WWAN side, and frequency ranges corresponding to filters on the WLAN side. The frequency ranges corresponding to filters on the WWAN side may be 2300 MHz-2370 MHz, and 2350-2400 MHz and the frequency ranges corresponding to filters on the WLAN side may be 2402 MHz-2432 MHz and 2432-2483 MHz. Therefore, after the first filter for the WWAN module is determined, the frequency range of the first filter may be transmitted to the WLAN module so as to determine the second filter based on the mapping table shown as 500C in FIG. 5C. In this way, the second filter on the WLAN side can be determined based on the frequency range of the determined filter on the WWAN side.

Figure 6:
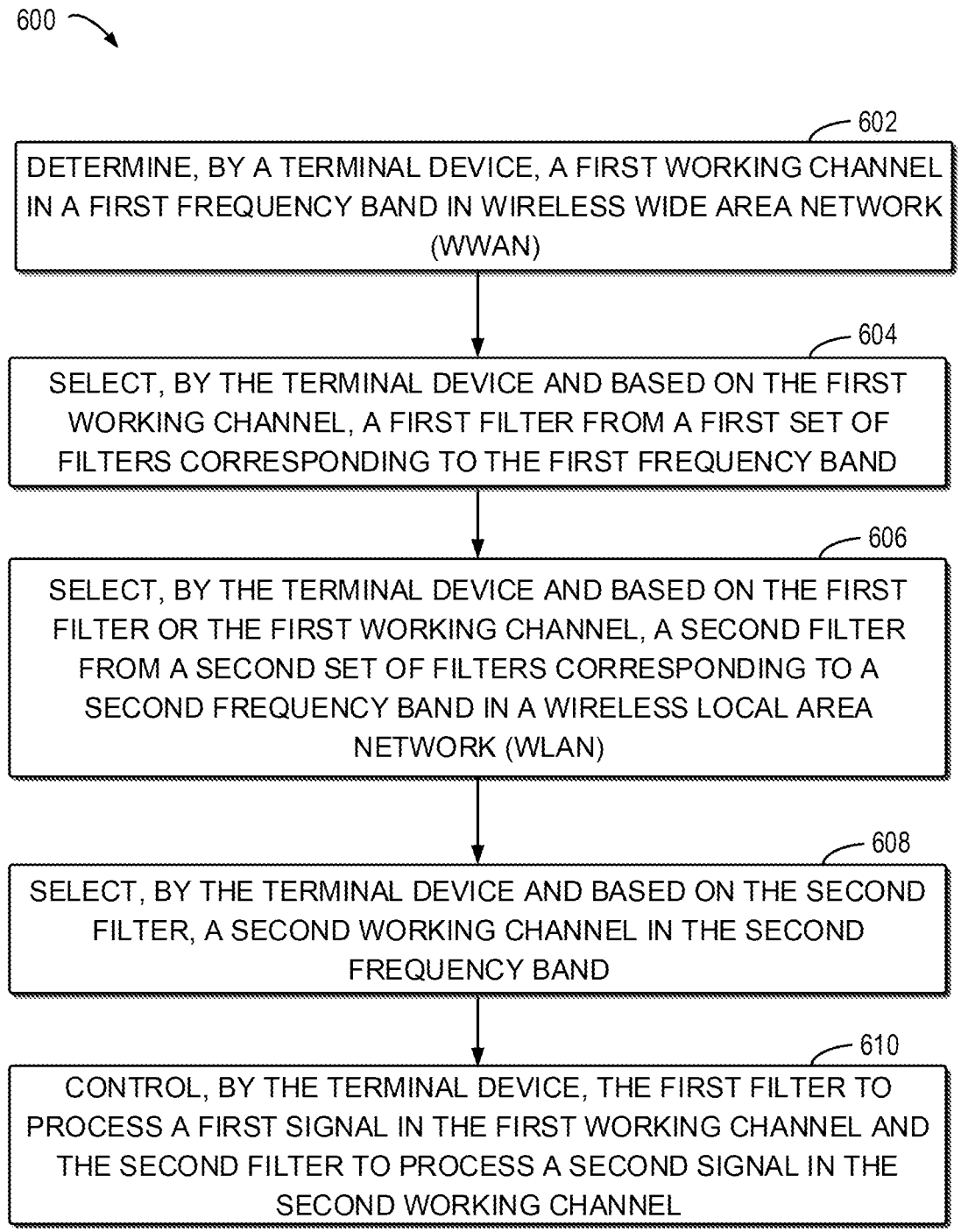
FIG. 6 illustrates a flow chart of an example method for simultaneously using the channels of WWAN and WLAN according to implementations of the present disclosure.

FIG. 6 illustrates a flow chart of an example method 600 according to implementations of the present disclosure, and the method 600 is performed by a terminal device such as a Customer Premise Equipment (CPE). At 602, the terminal device determines a first working channel in a first frequency band in a WWAN. For example, the terminal device 104 determines the first working channel between the base station 102 and the terminal device 104 from configuration information received from the base station 102. For example, the configuration information includes the first working channel determined by the base station, and the configuration information may be obtained by scanning channels in the first frequency band.

At 604, the terminal device selects a first filter from a first set of filters corresponding to the first frequency band based on the first working channel. As an example, each of the first set of filters 114-1, 114-2, . . . , and 114-N includes a frequency range. After the first working channel is determined, the terminal device 104 determines a frequency range to which the first working channel belongs. The filter corresponding to the frequency range is then selected from the first set of filters 114-1, 114-2, . . . , and 114-N.

At 606, the terminal device selects a second filter from a second set of filters corresponding to a second frequency band in a WLAN based on the first filter or the first working channel and a minimum distance between a first frequency range of the first filter and a second frequency range of the second filter is greater than a threshold distance. For example, after the terminal device 104 determines the first filter or the first working channel, a frequency range of the first working channel, an identifier, or a frequency range of the first filter may be transmitted to the WLAN module 110 so as to determine the second filter based on the above mapping table 500A, 500B, or 500C. The mapping table is predetermined, and the second filter on the WLAN side can be determined quickly based on the mapping table.

At 608, the terminal device selects a second working channel in the second frequency band based on the second filter. For example, after the second filter is selected, the terminal device 104 selects the second working channel from a set of channels corresponding to the second filter. As an example, the WLAN module 110 uses the 2.4G Wi-Fi band, and there are 13 channels corresponding to the 2.4G Wi-Fi band. The 13 channels are mapped to two filters 218 and 220. The filter 218 corresponds to channels 1-5, and the filter 220 corresponds to channels 6-13. If the filter 218 is selected as the second filter, the second working channel is selected from channels 1-5. If the filter 220 is selected as the second filter, the second working channel is selected from the channels 6-13.

At 610, the terminal device controls the first filter to process a first signal in the first working channel and the second filter to process a second signal in the second working channel. As an example, after the second working channel is determined, the terminal device 104 uses the first filter to process a first signal in the first working channel and the second filter to process a second signal in the second working channel simultaneously. Because the distance between the frequency range of the first working channel on the WWAN side and the frequency range of the second working channel on the WLAN side is greater than a threshold distance, the interference between the first working channel and the second working channel can be avoided. For example, the blocking noise and the in-band noise can be avoided, and the signal qualities of the two working channel will improve.

In this way, the terminal device does not need to give up the spectrum resources on the WWAN side, and can avoid the interference without increasing the common controller. Accordingly, it is cost-effective and does not require complex software configuration.

Figure 7:
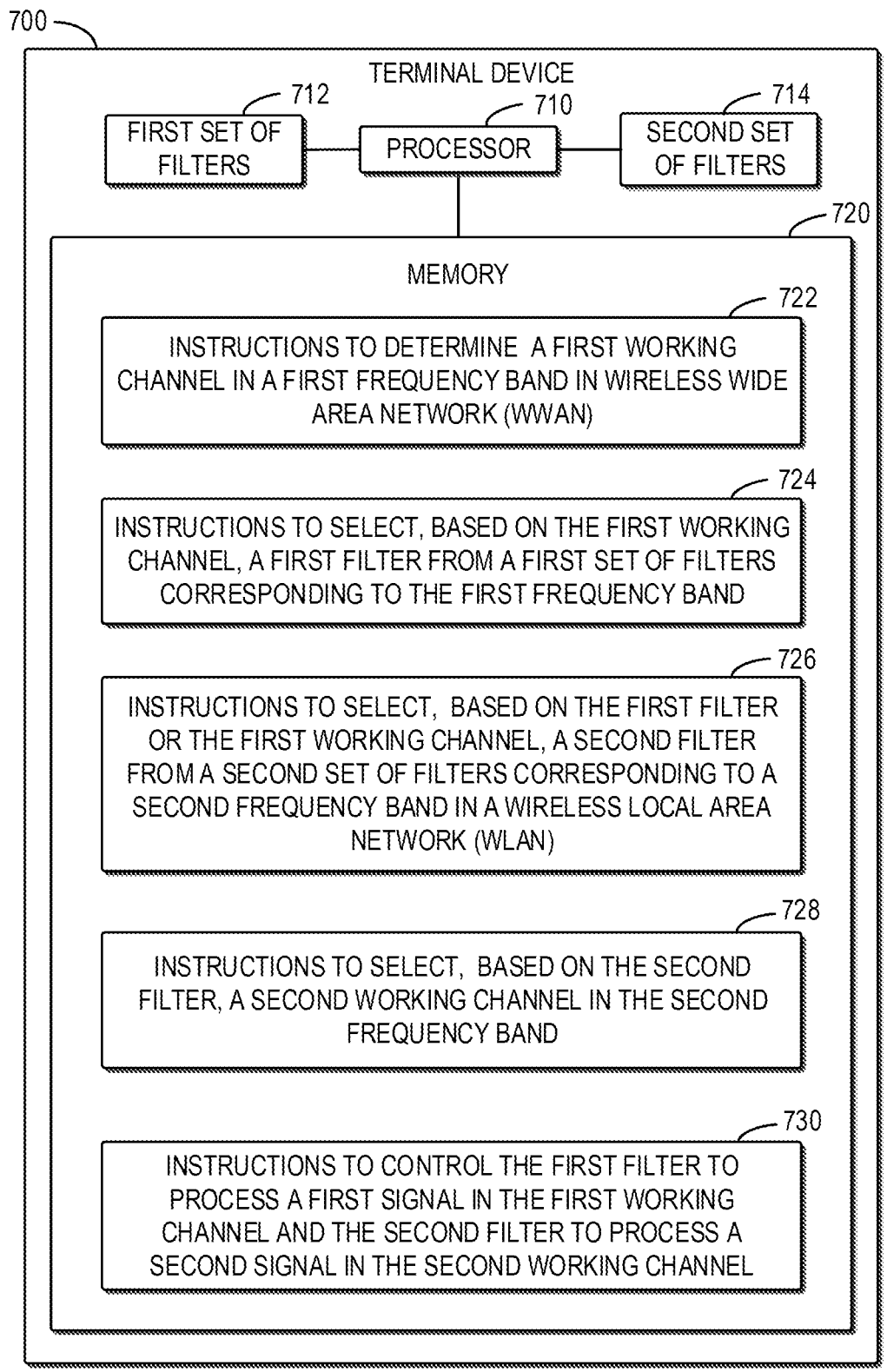
FIG. 7 illustrates an example terminal device according to implementations of the present disclosure.

FIG. 7 illustrates an example terminal device 700 according to implementations of the present disclosure. As shown in FIG. 7, the terminal device 700 comprises at least one processor 710, a first set of filters 712 and a second set of filters 714 coupled to the at least one processor 710, and a memory 720 coupled to the processor 710. The memory 720 stores instructions 722, 724, 726, 728, and 730 to cause the processor 710 to perform actions according to example implementations of the present disclosure.

As shown in FIG. 7, the memory 720 stores instructions 722 to determine a first working channel in a first frequency band in a WWAN. As an example, the instruction 722 is executed by the processor 710 to determine the first working channel of the WWAN module. In some implementations, the first working channel is determined from the configuration information received from the base station 102.

The memory 720 further stores instructions 724 to select a first filter from a first set of filters corresponding to the first frequency band based on the first working channel. For example, the instruction 724 is executed by the processor 710 to select a first filter from the first set of filters 712. In some implementations, after the first working channel is determined, if the frequency range of the filter in the first set of filters includes the first working channel, this filter will be determined as the first filter.

As shown in FIG. 7, the memory 720 further stores instructions 726 to select a second filter from a second set of filters corresponding to a second frequency band in a WLAN based on the first filter or the first working channel, and a minimum distance between a first frequency range of the first filter and a second frequency range of the second filter is greater than a threshold distance. As an example, the instruction 726 is executed by the processor 710 to select a second filter from a second set of filters 714 based on the first filter or the first working channel. In some implementations, when the frequency range of the first working channel, the identifier, or the frequency range of the first filter is determined, the mapping table 500A, 500B, or 500C may be used to select the second filter.

The memory 720 further stores instructions 728 to select a second working channel in the second frequency band based on the second filter. For example, the instruction 728 is executed by the processor 710 to select a second working channel from a set of channels corresponding to the second filter. In some implementations, there is a set of channels corresponding to the second filter. The second working channel may be selected from the set of channels corresponding to the second filter based on the channel qualities. Alternatively, the channel without interference may be selected as the second working channel.

As shown in FIG. 7, the memory 720 further stores instructions 730 to control the first filter to process a first signal in the first working channel and the second filter to process a second signal in the second working channel. As an example, the instruction 730 is executed by the processor 710 to control the first filter of the first set of filters 712 to process a first signal on the WWAN side and the second filter of the second set of filters 714 to process a second signal on the WLAN side. Therefore, the terminal device 700 can communicate with the base station 102 and the user device 106 without interference and can facilitate communication between the base station 102 and the user device 106.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:
   obtaining, by a terminal device, configuration information from a base station by scanning channels in a first frequency band in a wireless wide area network (WWAN), wherein scanning the channels in the first frequency band comprises:
     determining a set of frequency ranges corresponding to a first set of filters; and
     scanning the channels in each of the set of frequency ranges by using a respective filter of the first set of filters;
   determining, by the terminal device and based on the configuration information, a first working channel in the first frequency band;
   selecting, by the terminal device and based on the first working channel, a first filter from the first set of filters corresponding to the first frequency band;
   selecting, by the terminal device and based on the first filter or the first working channel, a second filter from a second set of filters corresponding to a second frequency band in a wireless local area network (WLAN), a minimum distance between a first frequency range of the first filter and a second frequency range of the second filter being greater than a threshold distance;
   selecting, by the terminal device and based on the second filter, a second working channel in the second frequency band; and
   controlling, by the terminal device, the first filter to process a first signal in the first working channel and the second filter to process a second signal in the second working channel.

2. The method according to claim 1, wherein selecting the first filter comprises:
   determining, by the terminal device, a working frequency of the first working channel; and
   selecting, by the terminal device and based on the working frequency, the first filter from the first set of filters, the first frequency range of the first filter including the working frequency.

3. The method according to claim 2, wherein selecting the second filter comprises:
   selecting, by the terminal device and based on the first working frequency, the second filter from the second set of filters.

4. The method according to claim 1, wherein selecting the second filter comprises:
   determining, by the terminal device, a mapping between the first set of filters and the second set of filters; and
   selecting, by the terminal device and based on the first filter and the mapping, the second filter from the second set of filters.

5. The method according to claim 4, wherein the mapping comprises one of the followings:
   a mapping between identifiers of the first set of filters and identifiers of the second set of filters; or
   a mapping between frequency ranges of the first set of filters and frequency ranges of the second set of filters.

6. The method according to claim 1, wherein selecting the second working channel comprises:
   determining, by the terminal device, a set of working channels in the second frequency band corresponding to the second frequency range; and
   selecting, by the terminal device and based on channel qualities, the second working channel from the set of working channels.

7. The method according to claim 6, wherein selecting the second working channel from the set of working channels comprises:
   in response to the set of working channels being interfered with each other, selecting the second working channel from the set of channels based on channel qualities; and
   in response to the set of working channels including at least two channels which do not interfere with each other, selecting the second working channel from the at least two channels based on channel qualities.

8. The method according to claim 1, wherein the first frequency band is Long-Term Evolution (LTE) Band 40, and the second frequency band is 2.4G Wi-Fi Band.

9. A terminal device comprising:
   at least one processor;
   a first set of filters and a second set of filters coupled to the at least one processor; and
   a memory coupled to the at least one processor, the memory storing instructions to cause the at least one processor to:
     obtain configuration information from a base station by scanning channels in a first frequency band in a wireless wide area network (WWAN), wherein scanning the channels in the first frequency band comprises:
       determining a set of frequency ranges corresponding to the first set of filters; and
       scanning the channels in each of the set of frequency ranges by using a respective filter of the first set of filters;
     determine, based on the configuration information, a first working channel in the first frequency band;
     select, based on the first working channel, a first filter from the first set of filters corresponding to the first frequency band;
     select, based on the first filter or the first working channel, a second filter from the second set of filters corresponding to a second frequency band in a wireless local area network (WLAN), a minimum distance between a first frequency range of the first filter and a second frequency range of the second filter being greater than a threshold distance;
     select, based on the second filter, a second working channel in the second frequency band; and
     control the first filter to process a first signal in the first working channel and the second filter to process a second signal in the second working channel.

10. The terminal device according to claim 9, wherein the instructions to select the first filter comprise instructions to cause the at least one processor to:
   determine a working frequency of the first working channel; and
   select, based on the working frequency, the first filter from the first set of filters, the first frequency range of the first filter including the working frequency.

11. The terminal device according to claim 10, wherein the instructions to select the second filter comprise instructions to cause the at least one processor to:
   select, based on the first working frequency, the second filter from the second set of filters.

12. The terminal device according to claim 9, wherein the instructions to select the second filter comprise instructions to cause the at least one processor to:
   determine a mapping between the first set of filters and the second set of filters; and
   select, based on the first filter and the mapping, the second filter from the second set of filters.

13. The terminal device according to claim 12, wherein the mapping comprises one of the followings:
   a mapping between identifiers of the first set of filters and identifiers of the second set of filters; or
   a mapping between frequency ranges of the first set of filters and frequency ranges of the second set of filters.

14. The terminal device according to claim 9, wherein the instructions to select the second working channel comprise instructions to cause the at least one processor to:
   determine a set of working channels in the second frequency band corresponding to the second frequency range; and
   select, based on channel qualities, the second working channel from the set of working channels.

15. The terminal device according to claim 14, wherein the instructions to select the second working channel from the set of working channels comprise instructions to cause the at least one processor to:
   in response to the set of working channels being interfered with each other, select the second working channel from the set of channels based on channel qualities; and
   in response to the set of working channels including at least two channels which do not interfere with each other, select the second working channel from the at least two channels based on channel qualities.

16. A non-transitory computer-readable medium comprising instructions stored thereon which, when executed by a terminal device, cause the terminal device to:
   obtain configuration information from a base station by scanning channels in a first frequency band in a wireless wide area network (WWAN), wherein scanning the channels in the first frequency band comprises:
      determining a set of frequency ranges corresponding to a first set of filters; and
      scanning the channels in each of the set of frequency ranges by using a respective filter of the first set of filters;
   determine, based on the configuration information, a first working channel in the first frequency band;
   select, based on the first working channel, a first filter from the first set of filters corresponding to the first frequency band;
   select, based on the first filter or the first working channel, a second filter from a second set of filters corresponding to a second frequency band in a wireless local area network (WLAN), a minimum distance between a first frequency range of the first filter and a second frequency range of the second filter being greater than a threshold distance;
   select, based on the second filter, a second working channel in the second frequency band; and
   control the first filter to process a first signal in the first working channel and the second filter to process a second signal in the second working channel.

* * * * *